(12) United States Patent
Borchers

(10) Patent No.: US 9,008,957 B2
(45) Date of Patent: Apr. 14, 2015

(54) METHOD AND DEVICE FOR AVOIDING AND/OR REDUCING THE CONSEQUENCES OF COLLISIONS

(75) Inventor: Oliver Borchers, Köln (DE)

(73) Assignee: Robert Bosch GmbH, Stuttgart (DE)

( * ) Notice: Subject to any disclaimer, the term of this patent is extended or adjusted under 35 U.S.C. 154(b) by 1372 days.

(21) Appl. No.: 12/305,426

(22) PCT Filed: Jun. 14, 2007

(86) PCT No.: PCT/EP2007/055893
§ 371 (c)(1),
(2), (4) Date: Apr. 28, 2009

(87) PCT Pub. No.: WO2008/009519
PCT Pub. Date: Jan. 24, 2008

(65) Prior Publication Data
US 2009/0299593 A1  Dec. 3, 2009

(30) Foreign Application Priority Data

Jul. 18, 2006  (DE) .................. 10 2006 033 145

(51) Int. Cl.
*G01C 21/26* (2006.01)
*B60W 30/09* (2012.01)
*B60W 10/184* (2012.01)
*B60W 10/20* (2006.01)
*B62D 15/02* (2006.01)

(52) U.S. Cl.
CPC ............. *B60W 30/09* (2013.01); *B60W 10/184* (2013.01); *B60W 10/20* (2013.01); *B62D 15/0265* (2013.01)

(58) Field of Classification Search
CPC ..... B60W 30/09; B60W 10/20; B60W 10/184; B62D 15/0265
USPC ............................................. 701/301, 300, 70
See application file for complete search history.

(56) References Cited

U.S. PATENT DOCUMENTS

| 6,275,773 | B1 * | 8/2001 | Lemelson et al. ............ 701/301 |
| 6,359,553 | B1 * | 3/2002 | Kopischke .................... 340/436 |
| 6,496,764 | B1 * | 12/2002 | Wang .............................. 701/45 |
| 6,597,974 | B2 * | 7/2003 | Roelleke ......................... 701/45 |
| 7,840,354 | B2 * | 11/2010 | Knoop et al. ................. 701/301 |
| 8,447,472 | B2 * | 5/2013 | Joh et al. ......................... 701/45 |
| 2004/0030498 | A1 * | 2/2004 | Knoop et al. ................. 701/301 |
| 2004/0193374 | A1 * | 9/2004 | Hac et al. ...................... 701/301 |
| 2006/0109094 | A1 * | 5/2006 | Prakah-Asante et al. ..... 340/435 |
| 2008/0291078 | A1 * | 11/2008 | Hilsebecher et al. ........... 342/70 |

FOREIGN PATENT DOCUMENTS

| DE | 196 47 283 | 5/1997 |
| DE | 10 2005 003 274 | 7/2006 |
| EP | 0 649 776 | 4/1995 |
| EP | 0 891 903 | 1/1999 |
| EP | 0 967 121 | 12/1999 |
| EP | 1 409 311 | 5/2006 |
| WO | WO 2006/053652 | 5/2006 |

* cited by examiner

*Primary Examiner* — Anne Georgalas
(74) *Attorney, Agent, or Firm* — Kenyon & Kenyon LLP

(57) ABSTRACT

A device for avoiding or reducing the consequences of collisions, an obstacle being recognized by a surroundings sensor and data of the obstacle are ascertained. The brakes are automatically actuated. Furthermore, an intervention in the steering system to evade the obstacle is performed only if the risk potential for the vehicle and that of other traffic participants is less than without an evasion maneuver.

4 Claims, 1 Drawing Sheet

METHOD AND DEVICE FOR AVOIDING AND/OR REDUCING THE CONSEQUENCES OF COLLISIONS

FIELD OF THE INVENTION

The present invention relates to a method and a device for avoiding and/or reducing the consequences of collisions, in particular of motor vehicles.

BACKGROUND INFORMATION

The increased use of electrically controllable braking and steering systems in motor vehicles and sensors for detecting possible obstacles in the vehicle surroundings makes systems for avoiding and/or reducing the consequences of collisions with obstacles possible.

Surroundings detection systems such as radar and/or video sensors make early recognition of potential collisions with obstacles possible, for example. These collisions may then be avoided or their consequences may be reduced via timely warning of the driver or by influencing the movement of the vehicle via controllable braking and/or steering systems. Sensor systems, for example, a video sensor with whose help objects may be detected and/or classified, are of particular relevance. Sensors for detecting the vehicle surroundings include, for example, ultrasound, radar, lidar, and/or video systems. Hydraulic units of ESP systems, actively controllable brake boosters, electrohydraulic braking systems or, in the future, electromechanical braking systems are/will be available, for example, as controllable subsystems of braking systems for active pressure buildup. Active steering systems or steer-by-wire systems (SBW) may be considered for influencing steering.

Collision avoidance systems or systems for reducing the consequences of collisions intervene in the movement of the vehicle via active, driver-independent braking and/or steering intervention. European Patent No. EP 891 903, for example, describes a device which brakes the vehicle automatically exactly when a collision with an obstacle may no longer be avoided by using the vehicle systems to their physical limits.

Unpublished German Patent No. DE 102005003274.5 shows an evasion assistant in which measures are described for calculating whether or not a collision is avoidable by braking only. Furthermore, an approach is provided for calculating a combined braking and steering intervention for evading the obstacle. These proposed calculations may also be used in the procedure described in the following and are therefore part of the procedure described in the following.

SUMMARY OF THE INVENTION

The method according to the present invention makes it possible to avoid or reduce the consequences of accidents with obstacles via automatic braking intervention and/or automatic lateral guidance intervention, for example, a steering intervention. An analysis of the surroundings situation is performed, and on the basis of this analysis a decision is made as to whether or not automatic lateral guidance intervention should take place. Automatic lateral guidance intervention is performed only if, on the basis of the detected surroundings situation, it may be assumed that the risk potential given by the presumptive collision is reduced by the lateral guidance intervention. The consequential damage in the event of a collision may thus be reduced by taking into consideration the particular traffic situation.

This has particular relevance in the context of pedestrian protection. The following procedure makes it possible to take into special consideration the interests of pedestrians when deciding on the measures to be initiated for collision avoidance or for reducing the consequences of a collision. For example, lateral guidance measures are not taken if this puts pedestrians at risk.

DETAILED DESCRIPTION

Described below is an assistance system for drivers of motor vehicles for performing an automatic lateral guidance intervention (hereinafter also steering intervention) when an impact of the vehicle on an obstacle, not avoidable via full braking, is recognized. The surroundings situation is detected and subsequently analyzed with the aid of a surroundings sensor situated in the vehicle, for example, a radar sensor, a lidar sensor, and/or a video sensor. Objects in the visual range of the sensor are detected and classified by object recognition methods. A probably unavoidable collision with one of the detected and classified objects is recognized by comparison with the foreseeable trajectory of the vehicle equipped with the surroundings sensor, and automatic braking of the vehicle is initiated.

A collision is recognized as unavoidable when the vehicle is moving toward the obstacle and is located at a distance range from the obstacle within which the vehicle cannot be brought to a standstill even by full braking. The foreseeable trajectory of the vehicle is determined, for example, on the basis of the instantaneous steering angle, the object located in the trajectory is identified (taking into account the dimensions of the vehicle), and the distance to this object, as well as the velocity of the vehicle, are measured. On the basis of the maximum possible deceleration of the vehicle by braking it is then ascertained whether or not the vehicle may come to a standstill within the distance. In the latter case the collision is assumed to be unavoidable.

Furthermore, in this case the foreseeable impact velocity when braking is determined (from the vehicle's velocity, distance, and braking deceleration). If the impact velocity is greater than a predefined threshold value, it is checked whether the ascertained surroundings situation allows for an evasive maneuver. The threshold value is selected in such a way that damage is assumed at higher impact velocities. The threshold value may also be a function of the recognized object, i.e., it may be lower (for example, near or equal to zero) in the case of a pedestrian as the recognized object than in the case of a vehicle. On the basis of the recognized type or class (for example, truck, passenger car, bicyclist, pedestrian, etc.) of one of the objects located on the possible evasion trajectory, a risk factor is ascertained on the basis of which a decision may be made as to whether or not to perform the automatic lateral guidance.

Figure 1:
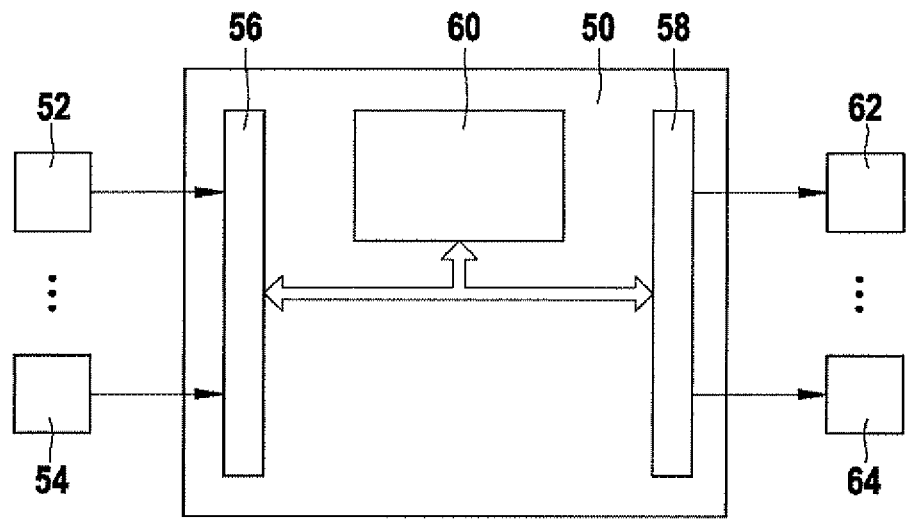
FIG. 1 shows a device according to the present invention.

FIG. 1 shows a device for performing the above-outlined procedure, in which a control unit 50 is provided, whose input component 56 receives signals from surroundings sensors 52 through 54. These sensors are one or more sensors depending on their design, for example, video, radar, and/or ultrasound sensors. Control unit 50 is essentially composed of input component 56, computer 60, and output component 58. These components are connected via a bus system. Actuators 62 through 64, for example, brakes and/or a steering system, are triggered via the output component.

The program outlined below runs in computer 60; the above-mentioned input and output signals are supplied to the computer and to the actuator(s) via components 56 and 58, respectively.

Figure 2:
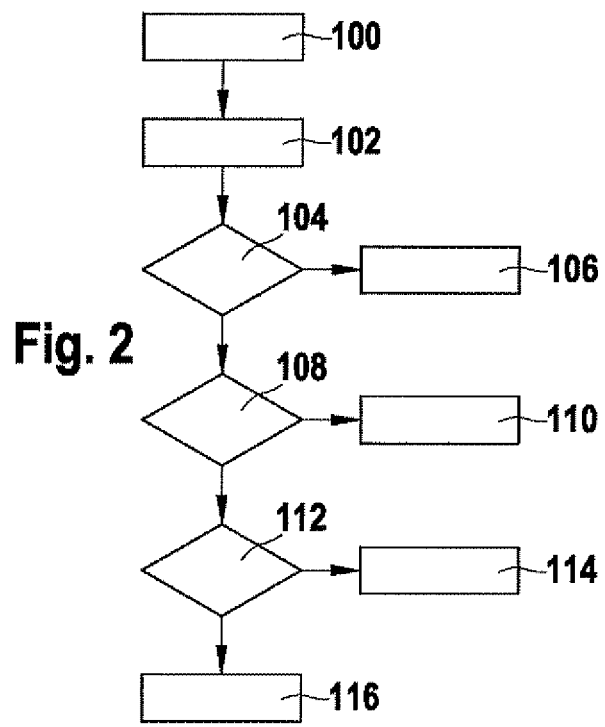
FIG. 2 shows a method according to the present invention.

FIG. 2 shows, via a flow chart, an advantageous implementation of the above-described procedure as a program of computer 60. The outlined program is run during the operation of the driver assistance system in predefined time intervals.

In first step 100 a foreseeably unavoidable collision with a detected and followed object is recognized with the help of the signal of at least one surroundings sensor, for example, a video sensor having object detection, and automatic braking is initiated. In one embodiment, it is determined whether an unavoidable collision is imminent by comparing the trajectory of the vehicle ascertained on the basis of the velocity and, for example, the steering angle, with the positions or series of positions of the recognized object. If the two curves intersect at a certain point in time (taking into account the dimensions of the vehicle and/or the object), the distance of the vehicle to the object is ascertained (for example, with the aid of a radar or ultrasound sensor or by analyzing the recorded images). If the distance is less than, for example, a safety distance derived from a possible deceleration of the vehicle, automatic braking for a predefined, preferably distance-dependent, deceleration is initiated.

In subsequent step 102, the impact velocity, i.e., the velocity of the vehicle (or, in the case of a stationary object, the relative velocity) when braking, for the distance traveled, is ascertained on the basis of the velocity of the vehicle, which is measured and supplied to device 50 over a bus system, a predefined deceleration value of the vehicle at automatic braking, for example, full braking, and of the distance. If the impact velocity is zero, the vehicle comes to a standstill by braking before reaching the object, and the collision is avoidable. If an impact velocity greater than zero results, the vehicle is unable to come to a standstill within the distance, and a collision is assumed to be unavoidable.

Another option includes calculating the slip of the wheels (difference between the wheel's velocity of rotation and reference quantity or velocity) and the foreseeable point where the vehicle foreseeably comes to a standstill from vehicle data such as velocity and rotational speed of the wheels. This is accomplished by calculating the time and the path traveled during this time on the presumptive trajectory. The point of standstill is derived therefrom. If this point is located before the point of intersection of both trajectories or the location of the object, the collision is assumed to be avoidable; otherwise it is assumed to be unavoidable.

In step 104 a check is made as to whether or not step 102 has resulted in that the collision may be avoided by braking alone, in particular by full braking or braking at a predefined deceleration. If this is the case, braking is continued according to step 106. No further measures are taken; the situation is recalculated starting at step 100.

If the calculation results in that the collision may not be avoided by braking, the risk potential is evaluated in step 108. Both the risk potential for the host vehicle and its driver as well as the risk potential for other traffic participants is taken into account.

In one embodiment, the type of the relevant object (truck, passenger car, pedestrian, etc.) is first determined on the basis of the object classification and a threshold value is established for the impact velocity as a function thereof. For example, in one embodiment, the value zero is determined for a pedestrian. On the other hand, a higher threshold value is assumed if the object is a truck. This value results from the risk to the host vehicle and its occupants. The threshold values are empirical values which are established for each vehicle type and each object type. If the calculated impact velocity is less than or equal to the threshold value, no further measures are taken and braking is performed (step 110).

If the impact velocity is greater than the threshold value, i.e., a higher risk potential is recognized for the host vehicle and/or the other traffic participant with whom a collision is unavoidable, the traffic situation is analyzed using the existing surroundings sensor system. The objects in the surroundings are detected, classified, and their position and/or trajectory is compared with possible evasion trajectories of the vehicle. In one embodiment, an evasion trajectory is obtained from a steering angle variation to be established which allows the recognized obstacle with which a collision is most probable to be driven around. In one embodiment, the concrete calculation of such a steering angle variation is performed as in the above-mentioned related art.

The probability of a collision with another object located on the evasion trajectory is then calculated on the basis of this steering angle variation, the deceleration predefined by the braking operation and the above-mentioned data. The risk potential to the host vehicle and/or of the other traffic participants in a collision with this object is also ascertained similarly to what has been described above (step 112). If this risk potential is smaller than the above-determined risk potential, a signal is supplied to the lateral guidance actuator similarly to the procedure of the above-mentioned related art, so that evasion takes place as braking is continued (step 116). If the risk potential on the evasion trajectory or on all possible evasion trajectories is greater, braking continues without lateral guidance intervention (step 114). The check of whether the risk potential is greater or smaller is made via threshold value comparison weighted by the object type. In the event of identical risk potentials, no evasion takes place. The program is then run again.

What is claimed is:

1. A computer-implemented method for at least one of avoiding and reducing consequences of a collision of a vehicle, comprising:

recognizing, by a processor, at least one obstacle in a path of the vehicle based on a signal from at least one surroundings sensor;

determining, by the processor, an impact velocity of the vehicle on the at least one obstacle; and executing, by the processor, an algorithm according to which:

if, and conditional upon that, the impact velocity exceeds a predefined threshold value, the processor:

detects objects not in the path of the vehicle;

determines, based on the detection, whether a risk to the vehicle and other traffic participants would be lowered with an intervention in a lateral guidance system to perform an evasion maneuver; and initiates the intervention conditional upon that the intervention has been determined to lower the risk; and if the impact velocity does not exceed the predefined threshold value, the processor initiates automatic braking of the vehicle.

2. The method according to claim 1, wherein respective risk potentials of a plurality of available evasion trajectories are determined and compared, and a trajectory of the plurality of available evasion trajectories whose risk potential is determined to be a smallest of the respective risk potentials is selected for the intervention.

3. The method according to claim 2, wherein the intervention in the lateral guidance system takes place via steering intervention.

4. A device for at least one of avoiding and reducing consequences of a collision of a vehicle, comprising:
- a control unit, which receives signals from at least one surroundings sensor and is configured to:
  - recognize an obstacle on the basis of the signals;
  - determine an impact velocity of the vehicle on the obstacle; and
  - execute an algorithm according to which:
    - if, and conditional upon that, the impact velocity exceeds a predefined threshold value, the control unit:
      - detects objects not in a path of the vehicle;
      - determines, based on the objects, whether a risk to the vehicle and other traffic participants would be lowered with an intervention in a lateral guidance system of the vehicle to perform an evasion maneuver; and
      - initiates the intervention conditional upon that the intervention has been determined to lower the risk; and
    - if the impact velocity does not exceed the predefined threshold value, the control unit initiates automatic braking of the vehicle.

* * * * *